United States Patent
Barbeau et al.

(10) Patent No.: US 7,391,182 B2
(45) Date of Patent: Jun. 24, 2008

(54) AUTOILLUMINATING RECHARGEABLE LAMP SYSTEM

(75) Inventors: Stéfane E. Barbeau, Roxbury, MA (US); Duane B. Smith, Roxbury, MA (US); Donald Drum, Billerica, MA (US)

(73) Assignee: Helen of Troy Limited, St. Michael (BB)

( * ) Notice: Subject to any disclaimer, the term of this patent is extended or adjusted under 35 U.S.C. 154(b) by 408 days.

(21) Appl. No.: 10/989,199

(22) Filed: Nov. 15, 2004

(65) Prior Publication Data

US 2005/0194930 A1    Sep. 8, 2005

Related U.S. Application Data

(63) Continuation-in-part of application No. 10/292,007, filed on Nov. 9, 2002, now Pat. No. 6,819,080, which is a continuation-in-part of application No. 09/885,848, filed on Jun. 20, 2001, now Pat. No. 6,479,965.

(51) Int. Cl.
*H01M 10/46* (2006.01)

(52) U.S. Cl. .................................... 320/107

(58) Field of Classification Search ........... 320/107, 320/104, 105; 362/157, 161, 171, 183, 184, 362/188

See application file for complete search history.

(56) References Cited

U.S. PATENT DOCUMENTS

| | | | |
|---|---|---|---|
| 3,277,358 A | 10/1966 | Nicholl | |
| 3,373,274 A | 3/1968 | Kott | |
| 3,418,552 A | 12/1968 | Holmes | |
| 3,517,185 A | 6/1970 | Moore et al. | |
| 3,576,990 A | 5/1971 | Johnson et al. | |
| 3,641,336 A | 2/1972 | Boin | |
| 3,746,877 A | 7/1973 | Seiter et al. | |
| 3,781,631 A | 12/1973 | Nelson et al. | |
| 3,809,882 A | 5/1974 | Wetmore | |
| 3,840,785 A | 10/1974 | Roszyk et al. | |
| 3,885,211 A | 5/1975 | Gutai | |
| 3,976,986 A | 8/1976 | Zabroski | |
| 4,029,954 A | 6/1977 | Moyer | |
| 4,150,302 A | 4/1979 | Roche | |
| 4,177,500 A | 12/1979 | Nicholl et al. | |
| 4,214,185 A | 7/1980 | Breeze | |
| 4,223,232 A | 9/1980 | Bulat | |
| 4,244,011 A | 1/1981 | Hammel et al. | |
| 4,374,354 A | 2/1983 | Petrovic | |
| 4,383,212 A | 5/1983 | Ballman | |

(Continued)

FOREIGN PATENT DOCUMENTS

DE     3938532     5/1991

(Continued)

*Primary Examiner*—Edward Tso
(74) *Attorney, Agent, or Firm*—Seyfarth Shaw LLP

(57) ABSTRACT

An autoilluminating rechargeable lamp system includes a set of one or more self-standing rechargeable lighting fixtures (luminaries) removably supported on a recharging and support member. The luminaries each include a light diffusor that may resemble a-that turn on when removed from the recharging and support member. The luminaries may also turn on when power to the recharging and support member is turned off, turning the luminaries on automatically as during a power failure. The luminaries may each be inductively coupled to the recharging and support member, which enables to provide an aesthetically pleasing interface free of electrical contacts.

10 Claims, 15 Drawing Sheets

U.S. PATENT DOCUMENTS

| | | | |
|---|---|---|---|
| 4,463,283 A | 7/1984 | Penny | |
| 4,605,993 A | 8/1986 | Zelina, Jr. | |
| 4,647,831 A | 3/1987 | O'Malley et al. | |
| 4,716,352 A | 12/1987 | Hurn et al. | |
| 4,739,242 A | 4/1988 | McCarty et al. | |
| 4,754,376 A | 6/1988 | Winslow | |
| 4,764,853 A * | 8/1988 | Thomas et al. | 362/183 |
| 4,827,245 A | 5/1989 | Lipman | |
| 5,010,454 A | 4/1991 | Hopper | |
| 5,039,929 A | 8/1991 | Veistroffer et al. | |
| 5,055,986 A | 10/1991 | Johnson | |
| 5,124,532 A | 6/1992 | Hafey et al. | |
| 5,233,271 A | 8/1993 | Huang | |
| 5,365,145 A | 11/1994 | Fields | |
| 5,392,162 A | 2/1995 | Glucksman | |
| 5,399,089 A | 3/1995 | Eickman et al. | |
| 5,426,347 A | 6/1995 | Nilssen | |
| 5,471,129 A | 11/1995 | Mann | |
| 5,473,517 A | 12/1995 | Blackman | |
| 5,535,108 A | 7/1996 | Logsdon | |
| 5,550,452 A | 8/1996 | Shirai | |
| 5,558,429 A | 9/1996 | Cain | |
| 5,662,406 A | 9/1997 | Mattice et al. | |
| 5,734,229 A | 3/1998 | Bavaro | |
| 5,748,080 A | 5/1998 | Clay | |
| 5,754,124 A | 5/1998 | Daggett et al. | |
| 5,801,513 A | 9/1998 | Smith et al. | |
| 5,900,715 A | 5/1999 | Roberts | |
| 5,908,233 A | 6/1999 | Heskett et al. | |
| 6,000,811 A | 12/1999 | Bordak | |
| 6,016,046 A | 1/2000 | Kaite et al. | |
| 6,034,505 A | 3/2000 | Arthur et al. | |
| 6,040,680 A | 3/2000 | Toya et al. | |
| 6,040,780 A | 3/2000 | Lucas | |
| 6,102,549 A * | 8/2000 | Thomas et al. | 362/183 |
| 6,179,438 B1 | 1/2001 | Parker | |
| 6,186,641 B1 | 2/2001 | Parker | |
| RE37,092 E | 3/2001 | Sharrah et al. | |
| 6,238,061 B1 | 5/2001 | McKenzie | |
| 6,243,276 B1 | 6/2001 | Neumann | |
| 6,268,027 B1 | 7/2001 | Wu | |
| 6,479,965 B2 | 11/2002 | Barbeau et al. | |
| 6,536,917 B1 | 3/2003 | Aperocho et al. | |
| 6,554,445 B1 | 4/2003 | Jacoby | |
| 6,599,001 B2 | 7/2003 | Johnson | |
| 6,605,900 B2 | 8/2003 | Chien | |
| 6,633,152 B2 | 10/2003 | Sharrah et al. | |
| 6,634,768 B2 | 10/2003 | McKenzie et al. | |
| 6,652,115 B2 | 11/2003 | Sharrah | |
| 6,659,621 B2 | 12/2003 | Sharrah et al. | |
| D485,390 S | 1/2004 | Stancik et al. | |
| D486,787 S | 2/2004 | Krieger et al. | |
| D495,819 S | 9/2004 | Krieger et al. | |
| 6,819,080 B2 | 11/2004 | Barbeau et al. | |
| 6,851,820 B2 | 2/2005 | Choi et al. | |
| 6,900,595 B2 | 5/2005 | Cojocary | |
| 6,909,260 B2 | 6/2005 | Parker | |
| 6,911,917 B2 | 6/2005 | Higgs | |
| 6,945,664 B1 | 9/2005 | Frieling et al. | |
| 6,986,589 B2 | 1/2006 | Evans et al. | |
| 7,006,002 B2 | 2/2006 | Shomali | |
| 7,011,426 B2 | 3/2006 | Gabor | |
| 7,029,146 B2 | 4/2006 | Kitchen | |
| 7,071,625 B2 | 7/2006 | Ceng et al. | |
| 7,125,145 B2 | 10/2006 | Gardner et al. | |
| 2002/0064041 A1 | 5/2002 | Parker | |
| 2003/0090892 A1 | 5/2003 | Su | |
| 2003/0141819 A1 | 7/2003 | Cojocary | |
| 2003/0142501 A1 | 7/2003 | Exilien | |
| 2004/0037069 A1 | 2/2004 | Blackbourn | |
| 2004/0160769 A1 | 8/2004 | Currie et al. | |
| 2004/0184273 A1 | 9/2004 | Reynolds et al. | |
| 2004/0252492 A1 | 12/2004 | Peterson | |
| 2005/0194930 A1 | 9/2005 | Barbeau et al. | |
| 2005/0196716 A1 | 9/2005 | Haab et al. | |
| 2005/0239007 A1 | 10/2005 | Dell'Aquila et al. | |
| 2005/0264261 A1 | 12/2005 | Barbeau et al. | |
| 2005/0284856 A1 | 12/2005 | Cafaro et al. | |
| 2006/0034078 A1 | 2/2006 | Kovacik et al. | |
| 2006/0062019 A1 | 3/2006 | Young | |
| 2006/0072306 A1 | 4/2006 | Woodyard | |
| 2006/0082988 A1 | 4/2006 | Riblett et al. | |
| 2006/0103543 A1 | 5/2006 | Chen et al. | |
| 2006/0120069 A1 | 6/2006 | West | |
| 2006/0133089 A1 | 6/2006 | Reid et al. | |
| 2006/0139927 A1 | 6/2006 | Kovacik et al. | |
| 2006/0171143 A1 | 8/2006 | Yuen | |

FOREIGN PATENT DOCUMENTS

| | | |
|---|---|---|
| DE | 4113442 | 10/1992 |
| DE | 4113442 A1 | 10/1992 |
| DE | 4220148 | 12/1993 |
| DE | 4220148 A1 | 12/1993 |
| GB | 2278428 | 11/1994 |
| JP | 05168175 | 10/1993 |

* cited by examiner

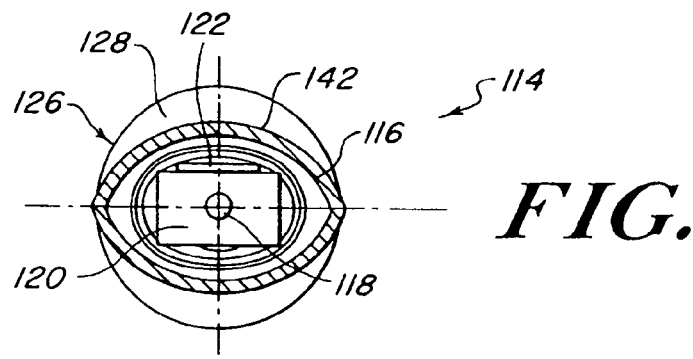
*FIG. 15*
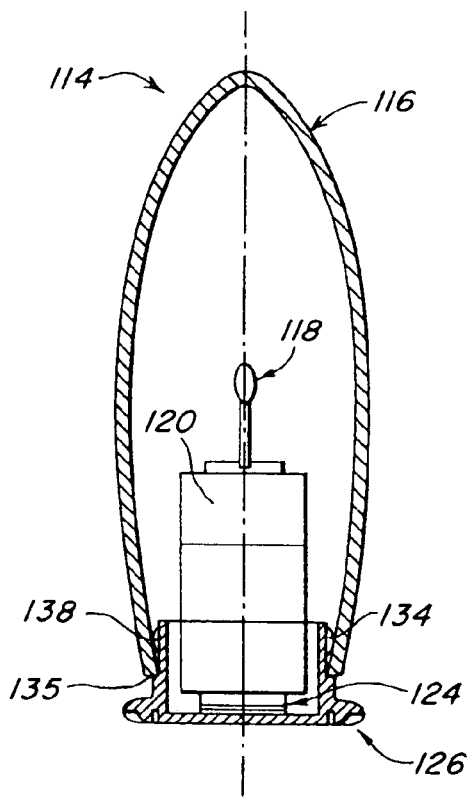
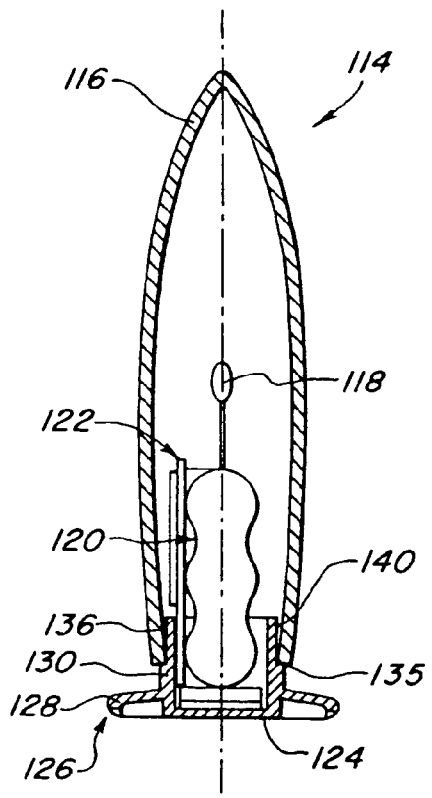
*FIG. 14*  *FIG. 13*

AUTOILLUMINATING RECHARGEABLE LAMP SYSTEM

CROSS-REFERENCE TO RELATED APPLICATIONS

The present invention is a continuation-in-part of allowed U.S. patent application Ser. No. 10/292,007, filed Nov. 9, 2002, now U.S. Pat. No. 6,819,080 which is a continuation-in-part of U.S. patent application Ser. No. 09/885,848, filed Jun. 20, 2001, U.S. Pat. No. 6,479,965, of the same inventive entity as herein, both incorporated herein by reference.

FIELD OF THE INVENTION

The present invention is drawn to the field of illumination, and more particularly, to a novel rechargeable lamp system.

BACKGROUND OF THE INVENTION

Candles may be moved and placed to provide illumination and/or ambience. While their utilitarian and aesthetic advantages are well-known, candles suffer from an undesirable self-consumption, needing to be replaced when used-up; produce smoke especially when snuffed, which may foul the air; require vigilant attendance to mitigate an ever-present fire hazard; are susceptible to being extinguished by gusts of air when used outdoors or moved around; and may give rise to undesirable wax build-up, which in many instances needs removed from candle support members or underlying structures.

There is thus a need to provide a rechargeable lamp system that enjoys the many utilitarian and aesthetic advantages of candles but is not subject to their disadvantages.

SUMMARY OF THE INVENTION

It is accordingly a general object of the present invention to disclose a rechargeable lamp system that provides candle-like lighting for indoor or outdoor use that avoids the problems associated with candles.

In accordance therewith, the autoilluminating rechargeable lamp system of the present invention includes a recharging platter adapted to receive a set of luminaries including a first circuit coupled to each luminary of said set of luminaries received thereon operative in response to supplied AC power to provide a charge signal to each luminary of said set of luminaries received thereon; and a set of luminaries each having a light emitting element connected to a rechargeable battery pack via a second circuit operative in one mode to charge said rechargeable battery pack in response to said charge signal when each luminary of said set of luminaries is received on said recharging platter and operative in another mode to activate said light emitting element in response to the absence of said signal, whereby, each said luminary lights if removed from said recharging platter and lights if no AC power is supplied to said recharging platter when received therein.

In the presently preferred embodiments, the set of luminaries includes one or more luminaries each of which is inductively coupled to the first circuit of the recharging platter. The inductive coupling provides automatic, hands-free recharging of the rechargeable battery pack of a luminary upon its receipt by the recharging platter, and provides automatic, hands-free actuation of a luminary when it is removed therefrom.

In the presently preferred embodiments, each luminary of the set of luminaries is self-standing and includes a diffusor that may be shaped to resemble a candle releasably mounted to a base member supporting said light emitting element therewithin.

In further accordance therewith, the autoilluminating rechargeable lamp system of the present invention includes a wall mountable charging base adapted to support a set of luminaries including a first circuit coupled to each luminary of said set of luminaries supported thereon operative in response to supplied AC power to provide a charge signal to each luminary of said set of luminaries supported thereon; and a set of luminaries each having a light emitting element connected to a rechargeable battery pack via a second circuit operative in one mode to charge said rechargeable battery pack in response to said charge signal when each luminary of said set of luminaries is supported thereon and operative in another mode to activate said light emitting element in response to the absence of said signal, whereby, each said luminary lights if removed from said wall mountable charging base and lights if no AC power is supplied to said wall mountable charging base when supported thereon.

In the presently preferred embodiments, the wall mountable charging base may be plugged directly into an AC wall outlet and/or mounted adjacent an AC wall outlet by any suitable mounting hardware.

In further accordance therewith, the autoilluminating rechargeable lamp system of the present invention includes a charging base adapted to support a set of luminaries including a first circuit coupled to each luminary of said set of luminaries supported thereon operative in response to supplied AC power to provide a charge signal to each luminary of said set of luminaries supported thereon; a sensor to provide a seat signal representative that each luminary of said set of luminaries is supported on said charging base; and a set of luminaries each having a light emitting element connected to a rechargeable battery pack via a second circuit operative in one mode to charge said rechargeable battery pack in response to said charge signal when each luminary of said set of luminaries is supported thereon and operative in another mode to activate said light emitting element in response to the absence of said seat signal, whereby, each said luminary lights if removed from said charging base and does not light if no AC power is supplied to said charging base when supported thereon.

In the presently preferred embodiments, the charging base may be provided with a removable cover that protects the luminaries during charging, storage, and a handle that aids in transit.

In further accordance therewith, the autoilluminating rechargeable lamp system of the present invention includes a charger member adapted to be supported by a surface and further adapted to receive a set of luminaries such that each luminary of the set of luminaries is supported on said support and in such a way that the charger at least partially surrounds a part of each luminary of the set of luminaries including a first circuit coupled to each luminary of said set of luminaries received thereby operative in response to supplied AC power to provide a charge signal to each luminary of said set of luminaries received thereby; and a set of luminaries each having a light emitting element connected to a rechargeable battery pack via a second circuit operative in one mode to charge said rechargeable battery pack and to de-light said light emitting element in response to detection of said charge signal when each luminary of said set of luminaries is received thereby and operative in another mode to activate said light emitting element in response to the absence of said signal, whereby, each said luminary lights if removed from said charger and de-lights when received thereby. The charger and luminaries are relatively movable so that the charger maybe removed from the set of luminaries while remaining on the support causing each luminary to light.

In one presently preferred embodiment, each luminary of the set of luminaries includes a diffusor releasably mounted to a base. A light support carried by the base allows replacement of the light emitting element and a rechargeable battery compartment carried by the base allows replacement of the rechargeable battery. In the presently preferred embodiments, the light support and battery compartment are adapted to allow manual light element and rechargeable battery replacement, and the diffusor is manually releasably mounted to the base, although light mechanical action could be employed to provide ease of light element and rechargeable battery replacement without departing from the inventive concepts. Multiple light emitting elements and corresponding supports may be provided for light animation effects.

BRIEF DESCRIPTION OF THE DRAWINGS

These and other objects, advantageous features and inventive aspects of the present invention will be more fully appreciated as the same becomes better understood from the following detailed description of the preferred embodiments when considered in connection with the accompanying drawings, in which:

FIG. 13 is a sectional view of the lamp module taken along line 13-13 of FIG. 9;

FIG. 14 is a sectional view of the lamp module taken along line 14-14 of FIG. 10.

FIG. 15 is a sectional view of the lamp module taken along line 15-15 of FIG. 9;

DETAILED DESCRIPTION OF THE PREFERRED EMBODIMENTS

Figure 1:
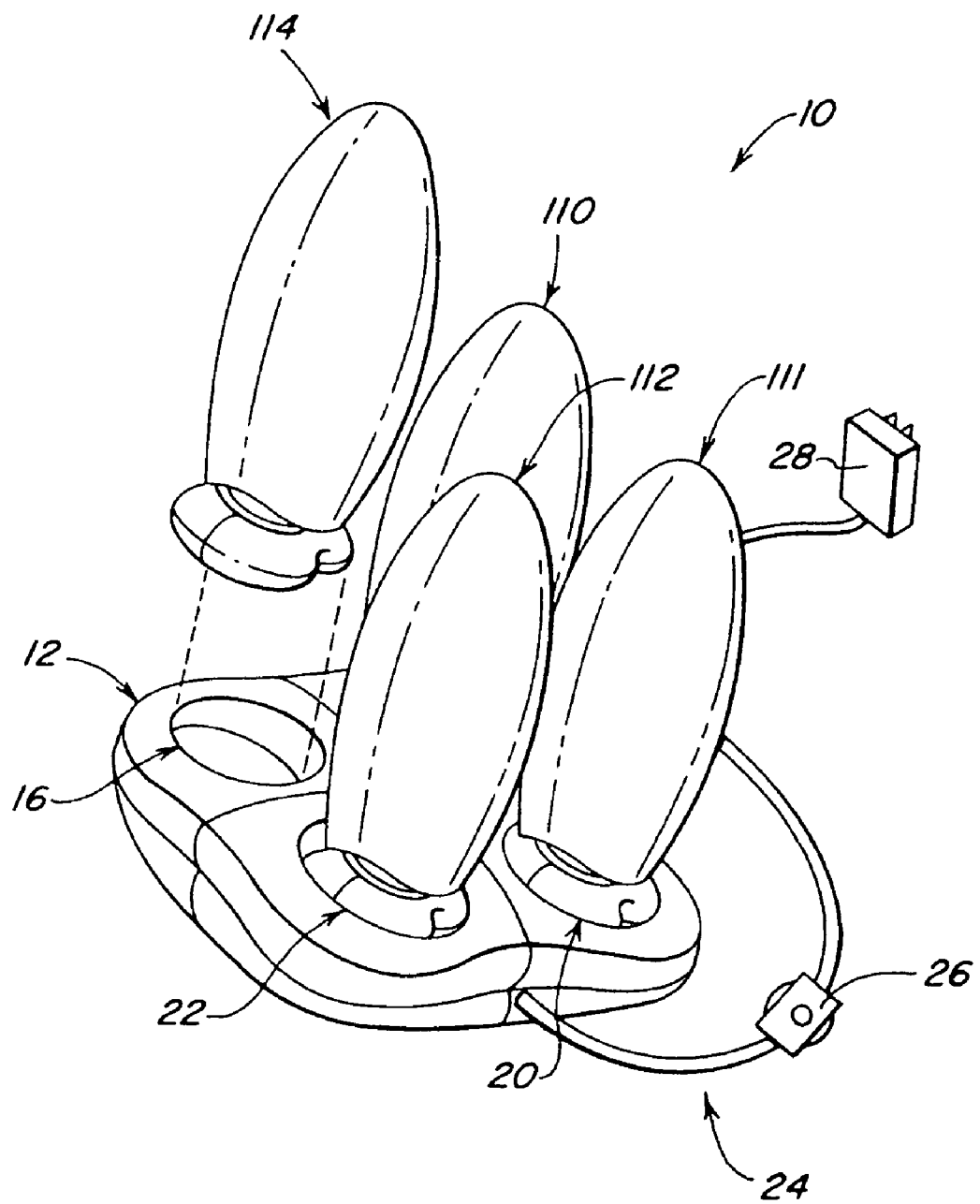
FIG. 1 is a perspective view of an exemplary embodiment of the present invention, showing a charging stand and one lamp module.

Referring now to FIG. 1, reference numeral 10 generally refers to the rechargeable lamp system of the present invention. Lamp system 10 comprises a charging stand 12 and a plurality of lamp modules 110, 111, 112 and 114.

Figure 2:
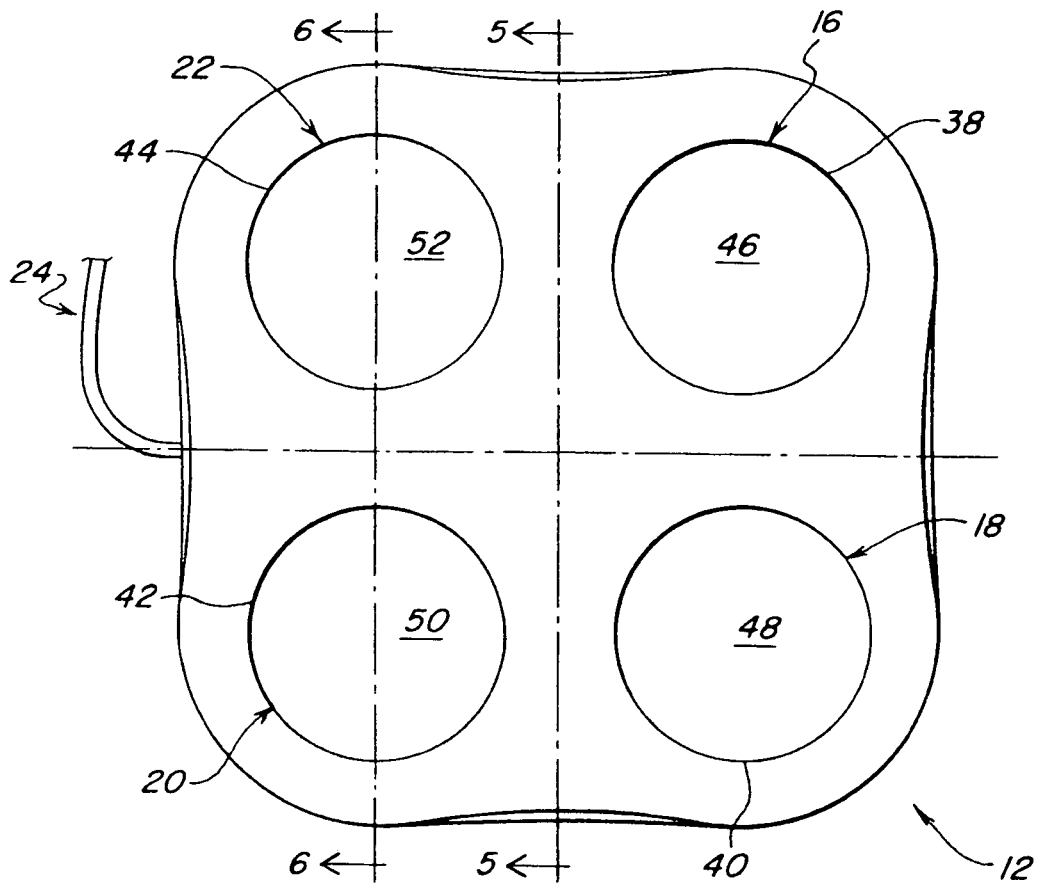
FIG. 2 is a top view of tie charging stand.

As shown in FIGS. 1 and 2, stand 12 comprises slots 16, 18, 20 and 22 which are each adapted to removably receive one of said lamp modules 110, 111, 112 and 114. Slots 16, 18, 20 and 22 each include a respective cylindrical wall 38, 40, 42, and 44 and a substantially planar floor 46, 48, 50 and 52.

A power cord 24 having an inline power switch 26 and a "wall-block" style transformer provides power to charging stand 12 via ordinary 120-volt household current. In alternate embodiments, the transformer may be dispensed with.

As will be described in greater detail herein, each of modules 110, 111, 112 and 114 is battery-powered and designed to be charged by magnetic induction when placed in a respective one of slots 16, 18, 20 and 22. Modules 110, 111, 112 and 114 are each designed to illuminate when removed from slots 16, 18, 20 and 22, or when AC power is cut off to charging stand 12.

The number of lamp modules (and a corresponding slot for each module) shown in the preferred embodiment is intended to be merely exemplary. It should be understood that the lamp system 10 of the present invention may be constructed with any number of modules.

Figure 3:
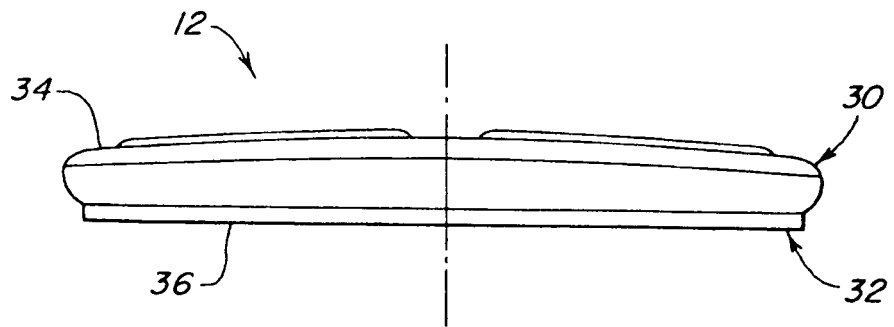
FIG. 3 is a front view of the charging stand.
Figure 4:
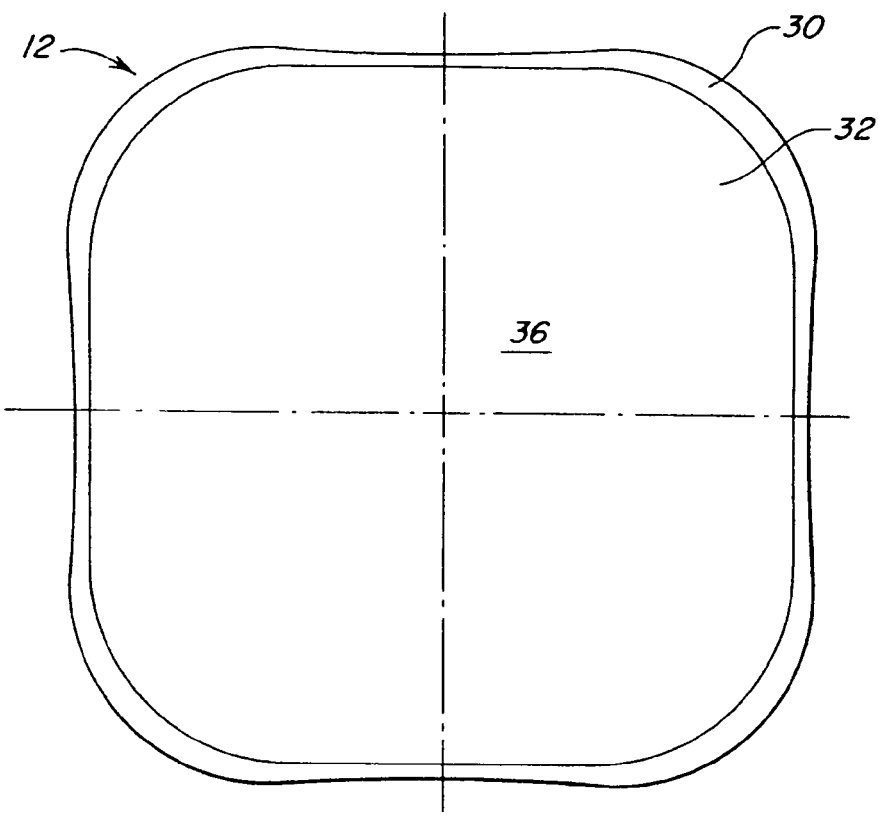
FIG. 4 is a bottom view of the charging stand.

Referring now to FIGS. 3-4, stand 12 also includes an upper portion 30 and a lower portion 32. In an exemplary embodiment, upper portion 30 is ceramic. However, upper portion 30 may be made from other suitable materials, such as wood or plastic. In the interest of economy, lower portion 32 in the exemplary embodiment is formed of injection-molded plastic, but may as well be made of other suitable materials, such as steel or other metal or other material. In the exemplary embodiment, upper portion 30 and lower portion 32 snap together. However, any suitable means, such as bonding, screws, etc. could be used to secure upper portion 30 and lower portion 32.

Figure 5:
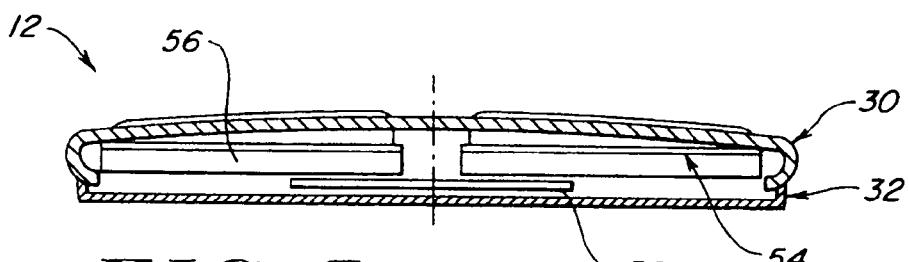
FIG. 5 is a sectional view of the charging stand, taken along line 5-5 of FIG. 2.
Figure 6:
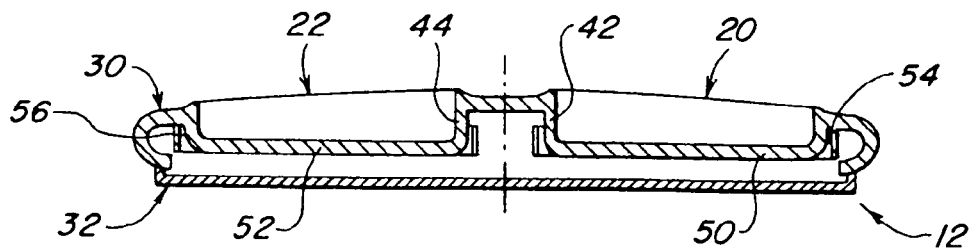
FIG. 6 is a sectional view of the charging stand, taken along line 6-6 of FIG. 2.

As shown in FIGS. 2, 5 and 6, stand 12 further includes a circuit board 58 which is hard-wired to cord 24 and four primary induction coils (wired in parallel), one coil encircling each of walls 38, 40, 42 and 44, respectively. FIG. 5 shows a pair of primary induction coils 54 and 56 that encircle walls 44 and 42, respectively. Identical primary coils (not shown) encircle walls 38 and 40.

Figure 7:
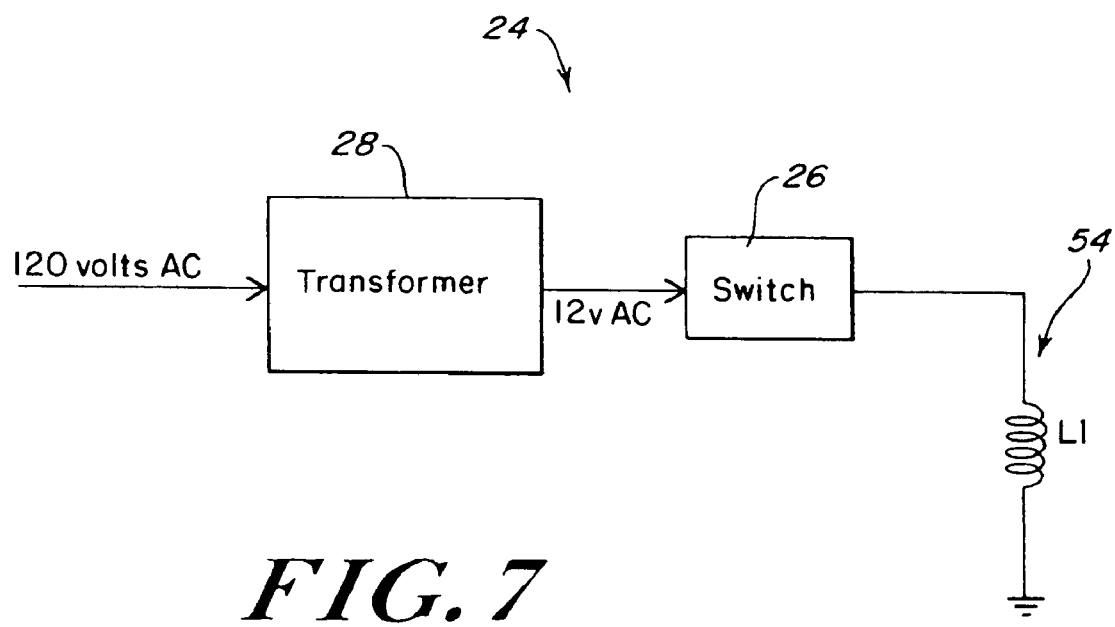
FIG. 7 is a circuit diagram of the charging stand circuit.
Figure 8:
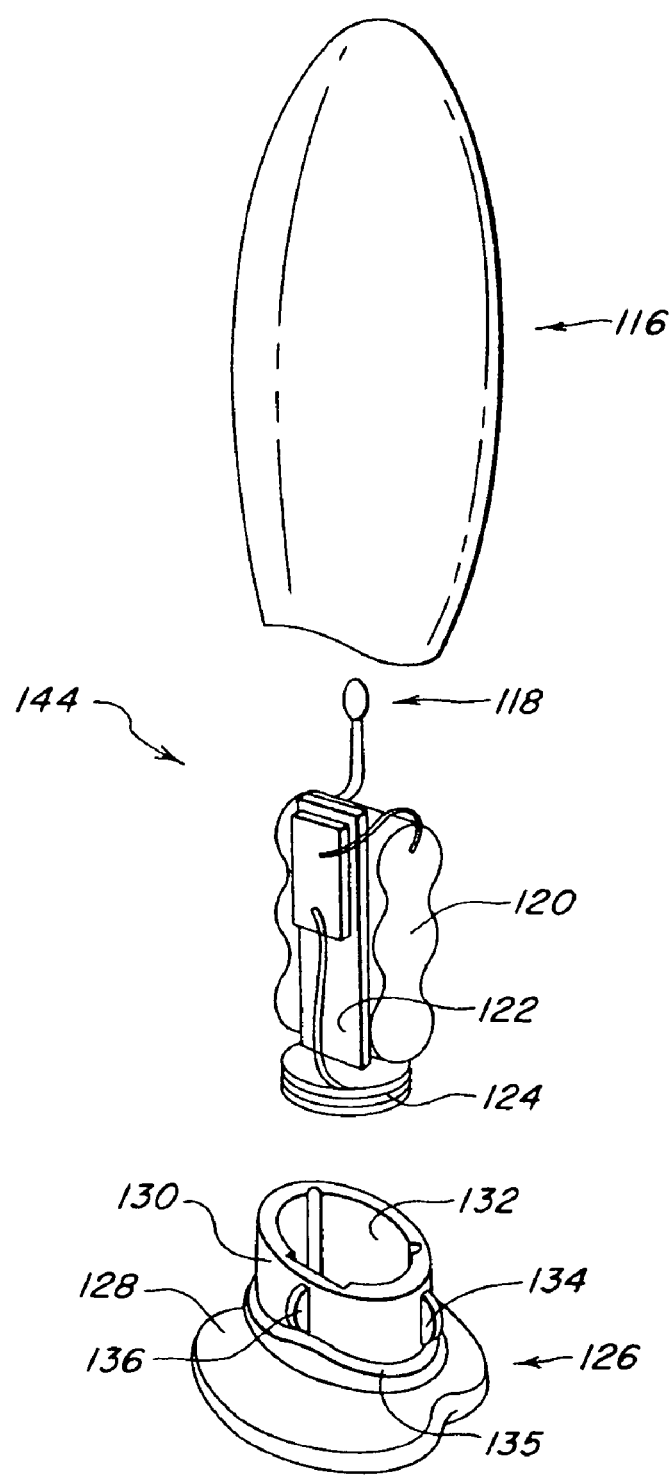
FIG. 8 is an exploded perspective view of an exemplary embodiment of a lamp module according to the present invention.
Figure 11:
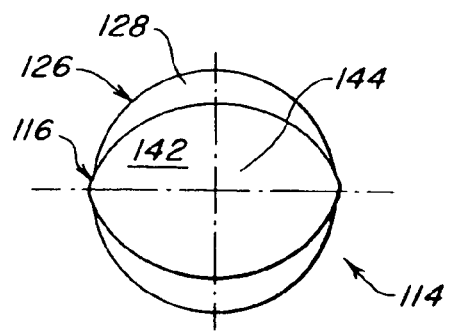
FIG. 11 is a top view of the lamp module.
Figure 10:
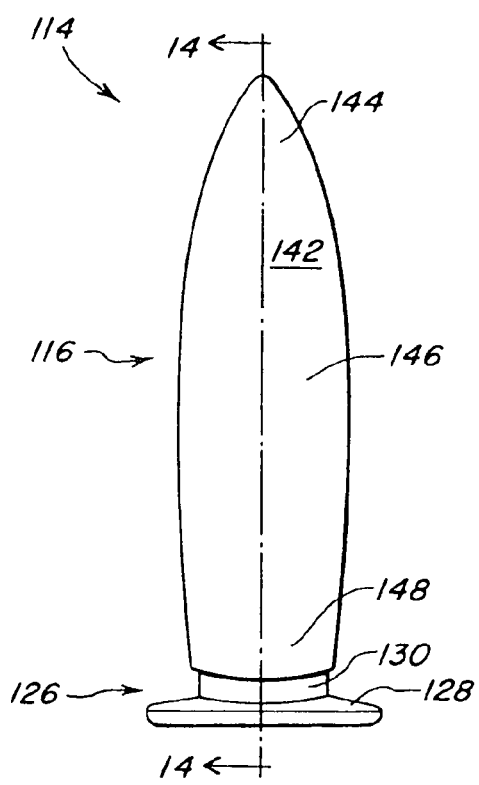
FIG. 10 is a right side view of the lamp module.
Figure 9:
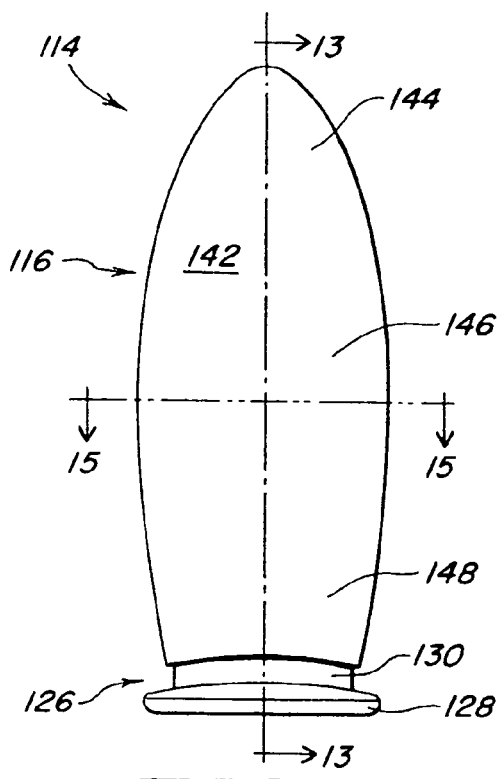
FIG. 9 is a front view of the lamp module.
Figure 12:
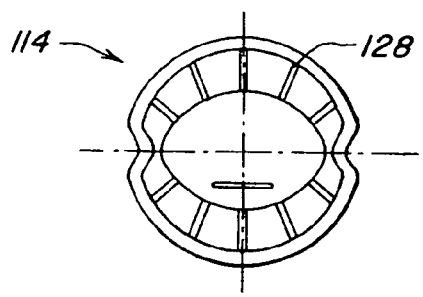
FIG. 12 is a bottom view of the lamp module.

FIG. 7 shows the circuit formed by transformer 28, inline power switch 26, and primary induction coil 54. As shown in FIG. 7, transformer 28 converts 120 volts AC to 12 volts AC. The three other primary induction coils, not shown, are preferably wired in parallel with primary induction coil 54. In other embodiments, the transformer component can be replaced by the inductor coils (on the platter and luminaries), whose turn-ratios are selected to provide a stepped-down voltage to the lamps. As will be appreciated by those of skill in the art, an oscillator providing frequencies higher than line frequency may be employed to improve efficiency (inductor size and attendant cost).

Modules 110, 111 and 112 are identical to module 114. Thus, it will only be necessary to describe module 114 in detail.

As shown in FIGS. 8-16, module 114 comprises a diffuser 116, a light bulb 118, a battery pack 120, a circuit board 122, a secondary induction coil 124 and a base 126.

Diffuser 116 in the exemplary embodiment is formed of blow-molded plastic (or glass) having a frosted outer surface 142. It could also be injection-molded plastic with a frosted, translucent finish. In the exemplary embodiment, diffuser 116 is slender and elongated in shape and includes a mid-section 146 that tapers upwardly to a tip 144 and tapers slightly to a tail 148. This shape is chosen to provide optimal light color and transmission, as well as even diffusion of light from bulb 118. Obviously, numerous alternative shapes for diffuser 116 are possible. However, the internal volume created by diffuser 116 must be sufficient to envelop bulb 118, battery pack 120 and circuit board 122. In addition, because of the heat generated by bulb 118, it is desirable to provide air space between bulb 118 and diffuser 116 to prevent diffuser 118 from melting or deforming.

Base 126 comprises a lower portion 128 that provides stable support for module 114 when placed on a level surface or within slot 16. Neck 130 is adapted to removably receive diffuser 116 (to enable access to bulb 118 and battery pack 120). Neck 130 includes tabs 134, 136, 138 and 140 and a lip 135 that cooperate to secure tail 148 of module 114 to neck 130 (see FIGS. 8, 13 and 14).

Battery pack 120 in the exemplary embodiment comprises three "AA" Nickel-Cadmium (Ni-Cad) cells wrapped in PVC shrink-wrap and having a total output of 3.6 Vdc and 500-800 mA. Of course, other types and sizes of rechargeable cells, such as Nickel-Metal-Hydride or Lithium cells, could be substituted for the Ni-Cad cells. Such cells would provide more power, and charge more quickly than Ni-Cads, but are substantially more expensive.

The power requirements for bulb 118 are, of course, chosen to match the power output of battery pack 120. In the exemplary embodiment, bulb 118 is a conventional miniature incandescent bulb, such as Chicago Miniature Lamp, Inc. part # CM1738, having an output of 1 candela and having design power requirements of 2.80V and 60 mA and an expected life of 6,000 hours. Of course, other lamps and types of light sources, such as a light-emitting diode (L.E.D.) may be substituted for bulb 118. The incandescent bulb shown is preferred because of its balance of cost, heat generation, power consumption, expected service life and brightness characteristics.

Figure 16:
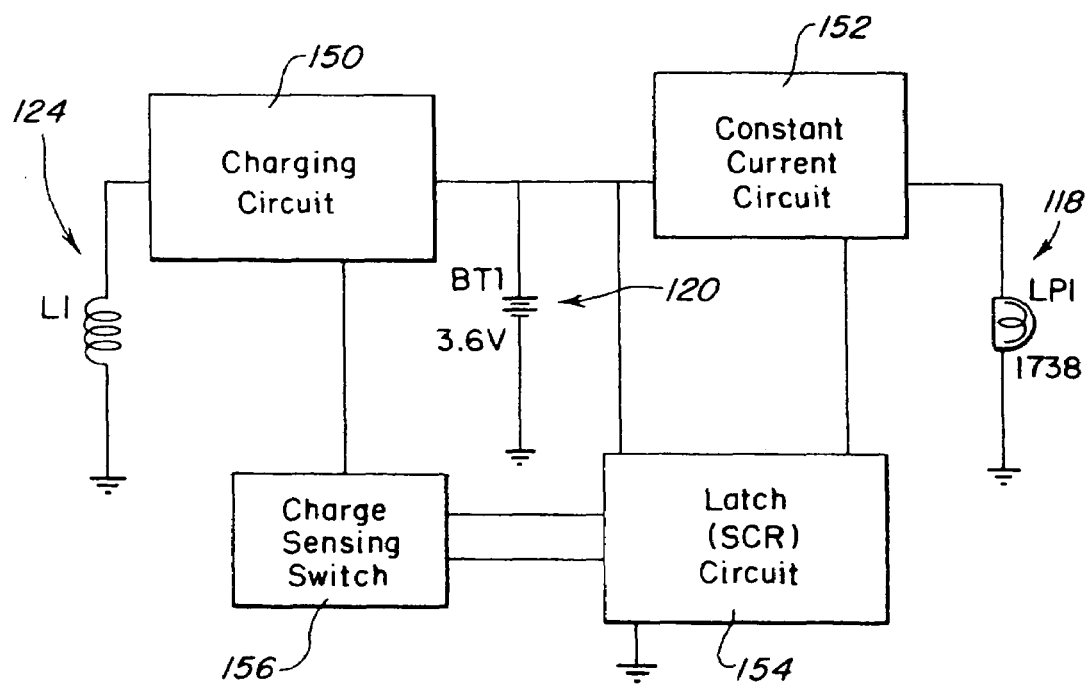
FIG. 16 is an exemplary embodiment of a circuit diagram of the lamp module circuit board according to the present invention.

As shown in FIGS. 13 and 14, bulb 118 and battery pack 120 are preferably hard-wired to circuit board 122. As shown in FIG. 16, circuit board 122 comprises four primary circuits that control the charging of battery pack 120 and the lighting of bulb 118.

A charging circuit 150 regulates the voltage and current flowing to battery pack 120 from secondary induction coil 124 to prevent damage to battery pack 120. A latch circuit 154 cuts off current to bulb 118 when the voltage output of battery pack 120 drops below 3.1 volts, thus preventing damage to battery pack 120 which could be caused by fully draining battery pack 120. A charge-sensing switch 156 works in cooperation with latch circuit 154 to turn off current to bulb 118 when current is detected in charging circuit 150. A constant current source circuit 152 provides a constant flow of current (65 mA in the exemplary embodiment) to bulb 118. This enables bulb 118 to shine at a constant brightness despite fluctuations in the output current from battery pack 120. In alternate embodiments, a constant voltage source could be employed.

As described above, battery pack 120 is charged by magnetic induction. The magnetic field created by primary induction coil 54 (when current is applied) induces a current in secondary induction coil 124 when secondary induction coil 124 is concentrically located relative to primary induction coil 54. In the present invention, this occurs when module 114 is placed within slot 16 (see FIG. 1).

It is preferable to ship battery pack 120 fully charged, as this will increase the shelf life of the Ni-Cad cells. However, shipping battery pack 120 fully charged requires the inclusion of means for electrically isolating battery pack 120 from lamp 118 between the time battery pack 120 is charged and when module 114 is first used by an end consumer. Such means could comprise a Mylar tab (not shown) inserted between two electrical contacts after the initial charging which would be removed by the consumer before first use. Alternatively, such means could comprise a fusible link (not shown). The fusible link would be adapted to close current regulating circuit 152 when current is sensed in charging circuit 150 (i.e., the first time the consumer plugs in charging stand 12).

Operation of lamp system 10 is elegantly straightforward. As described above, bulb 118 is designed to illuminate when no current is sensed in charging circuit 150. Thus, bulb 118 will automatically turn on when module 114 is removed from slot 16. Charging stand 12 and module 114 can also function as a table lamp by leaving module 114 in slot 16 and switching off inline power switch 26. Module 114 also functions as an emergency light—automatically turning on during a power failure.

Figure 17:
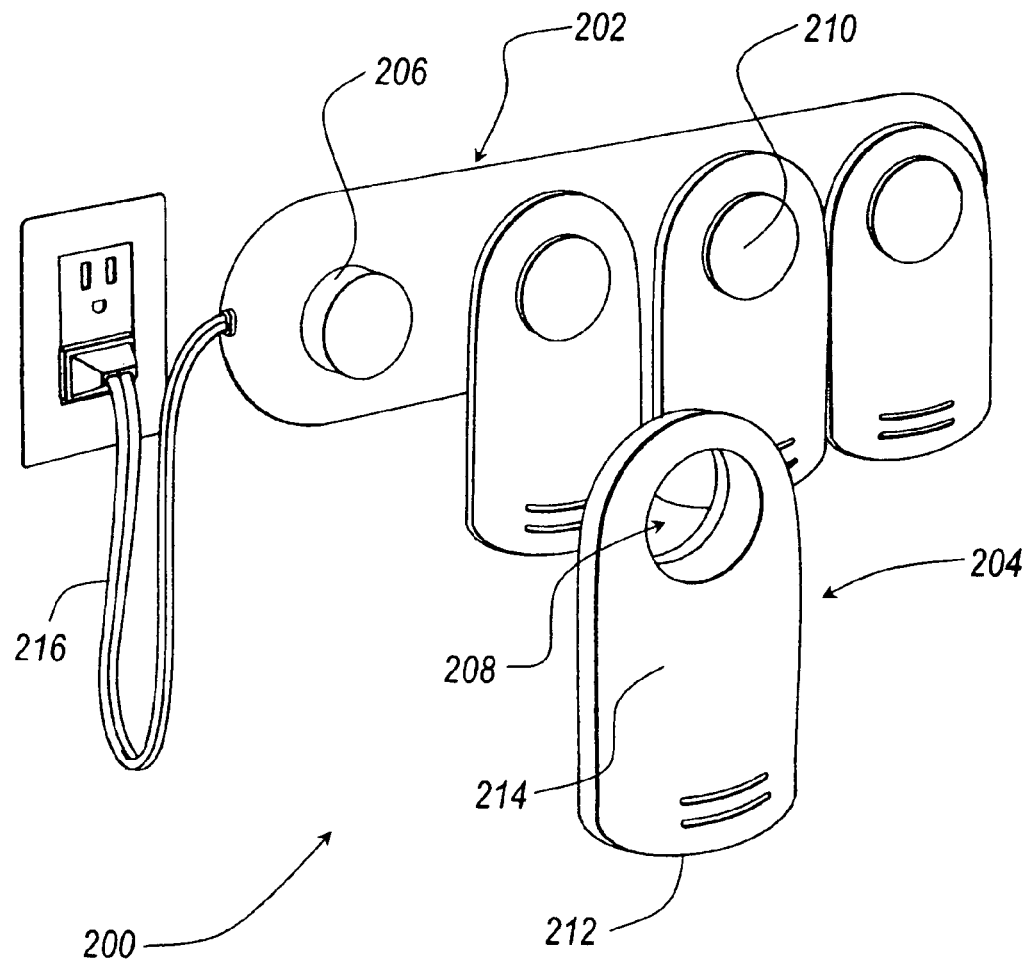
FIG. 17 is a pictorial view of another exemplary embodiment of the present invention, showing a wall mountable charging base and four lamp modules.

Referring now to FIG. 17, reference numeral 200 generally refers to another exemplary embodiment of the rechargeable lamp system of the present invention. Lamp system 200 comprises a wall mountable charging base generally designated 202 and four lamp modules generally designated 204. The number of lamp modules shown in the preferred embodiment is intended to be merely exemplary. It should be understood that the lamp system 200 of the present invention may be constructed with any number of modules.

As shown, the wall mountable charging base 202 comprises projections 206 spaced laterally apart a distance larger than the width of each lamp module 204, and each lamp module 204 comprises an opening therethrough generally designated 208 adjacent to its top surface. The projections 206 cooperate with the openings 208 to removably support the lamp modules 204 on the wall mountable charging base 202. Projections 206 and openings 208 are each of generally cylindrical geometry, although projections and openings of another geometry or other removable supporting means may be employed without departing from the inventive concepts.

Each projection has a free end, and a diffuser 210 is removably or fixedly mounted to the free end over an LED and ambient light sensor mounted thereon not shown, that switches the LED "on" in response to a condition of ambient darkness, Each lamp module 204 has a flat base 212 and a front face diffuser 214 that extends from top to bottom and surrounds the opening 208. The flat base 212 enables to place each lamp module 204 on a shelf or table and the opening 208 allows it to be carried about or hung on a hook to provide illumination in a wide variety of situations.

A power cord 216 having an inline power switch, not shown, provides power to wall mountable charging base 202 via ordinary 120-volt household current. The base 202 may be wall mounted over or spaced in relation to the AC wall outlet by any suitable mounting means, and a recess and/or power cord wrap or other means may be employed to stow any excess cord within the wall mountable charging base 202. In alternate embodiments, the power switch may be dispensed with.

As in the embodiment described above in connection with the description of the FIGS. 1-16, each lamp module 204 is designed to be charged by magnetic induction. Inductive magnetic coupling is provided by primary and secondary coils, not shown, carried on the projections 206 of the charging base and about the openings 208 of the lamp modules 204 when supported by a respective one of the projections 206. Other coupling means such as mating electrical contacts or other means could be employed without departing from the inventive concepts, As in the embodiment described above in connection with the description of the FIGS. 1-16, modules 204 are each designed to illuminate when removed from projections 206, or when AC power is cut off to wall mountable charging base 202, The wall mountable recharging base includes a first charge circuit responsive to supplied AC power to provide a charge signal and each lamp module includes a light emitting element connected to a rechargeable battery pack via a second circuit operative in one mode to charge the rechargeable battery pack in response to the charge signal when each lamp module is supported by the wall mountable charging base and operative in another mode to activate the light emitting element in response to the absence of the charge signal, whereby, each lamp module lights if removed from the wall mountable recharging base and lights if no AC power is supplied to the wall mountable recharging base when supported thereon.

A switch, not shown, may be provided to independently turn each lamp module 204 on/off to conserve charge or to use the light as needed.

Figure 18:
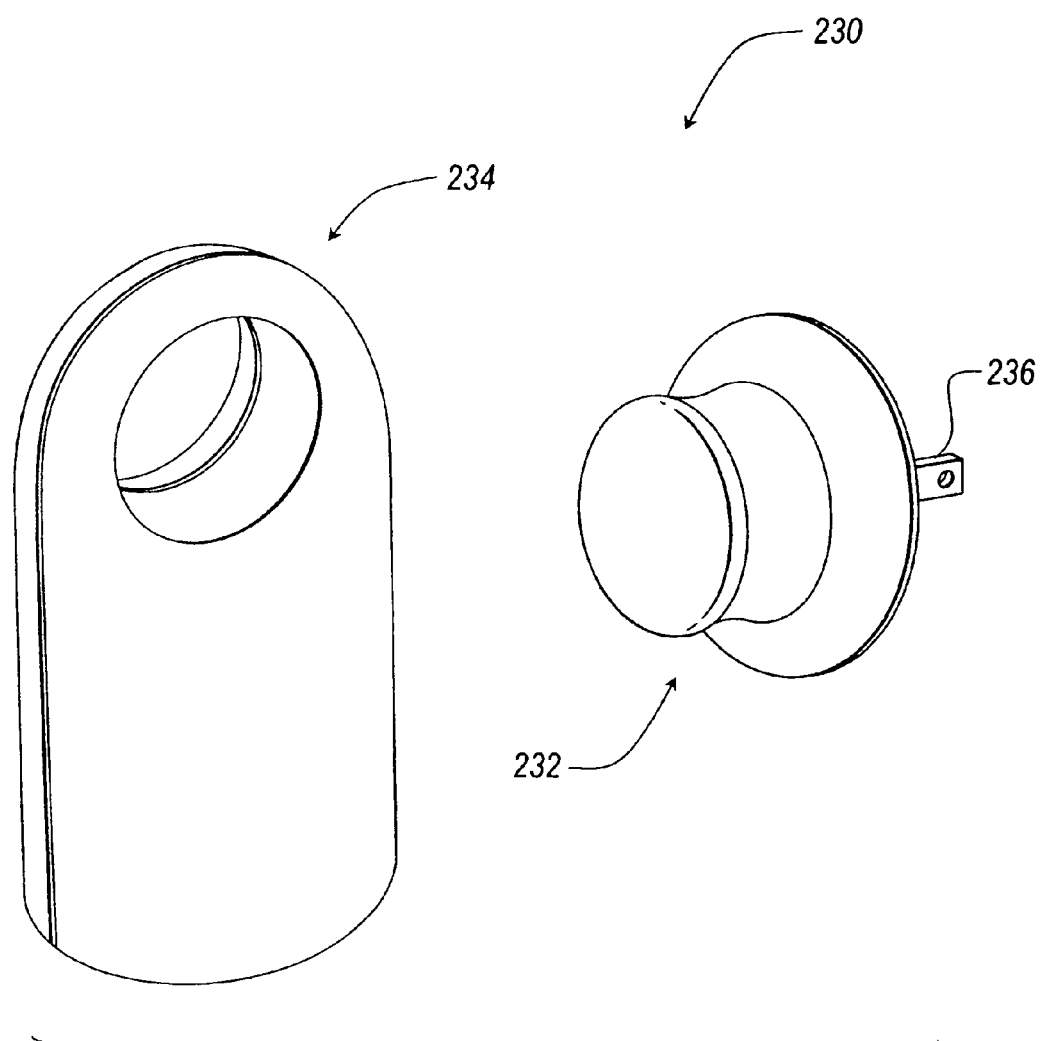
FIG. 18 is a pictorial view of another exemplary embodiment of the present invention, showing a wall plug mountable charging base and single lamp modules.

Referring now to FIG. 18, reference numeral 230 generally refers to another exemplary embodiment of the rechargeable lamp system of the present invention. Lamp system 230 comprises a wall plug mountable charging base generally designated 232 and a single lamp module generally designated 234. The embodiment 230 is generally the same as the embodiment 200 described above in connection with the description of FIG. 17, except the wall plug mountable charging base 232 includes extending plug members 236 adapted to plug the base directly into a standard AC wall outlet.

Figure 19:
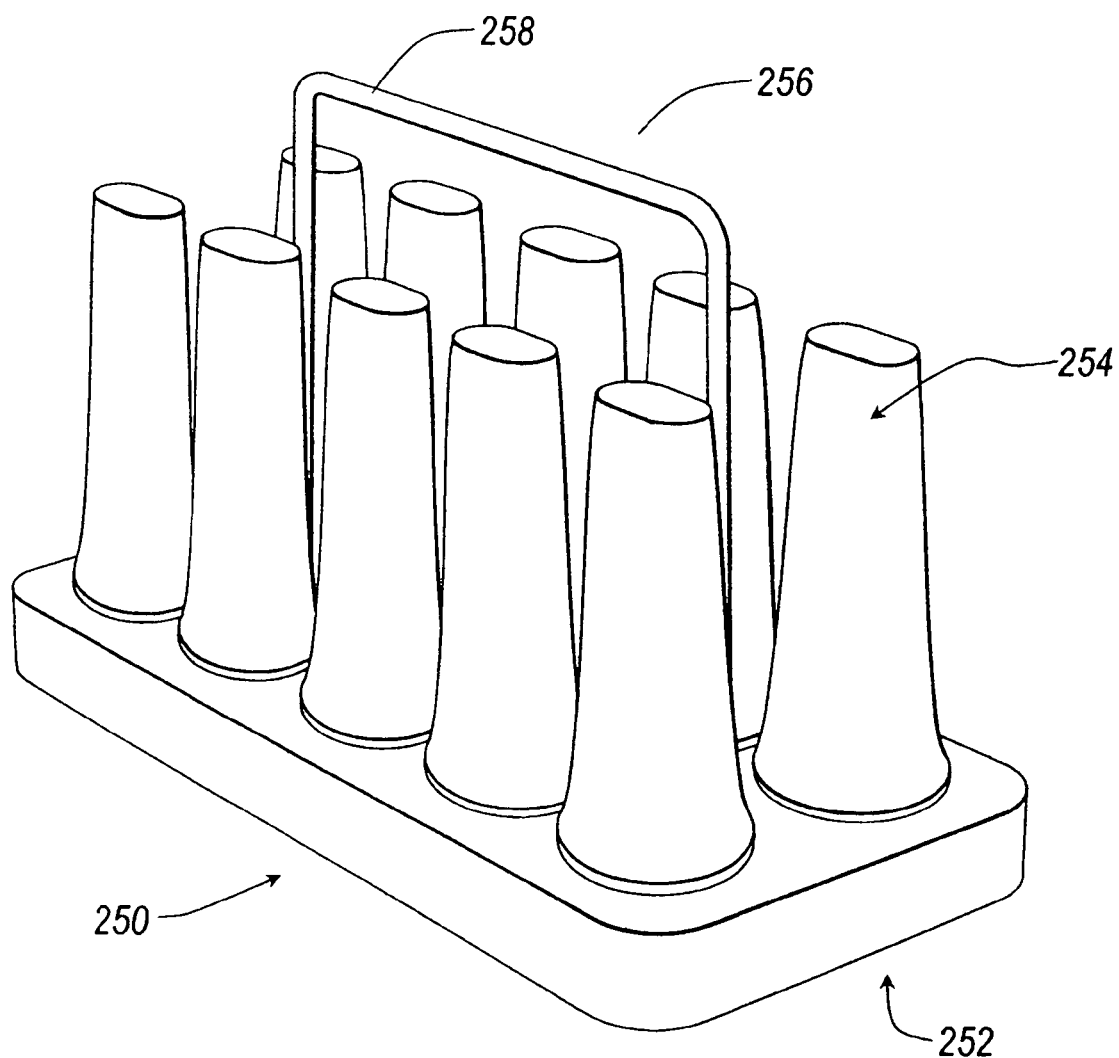
FIG. 19 is a pictorial view of another exemplary embodiment of the present invention, showing a carrier/charging base and eight lamp modules.

Referring now to FIG. 19, reference numeral 250 generally refers to another exemplary embodiment of the rechargeable lamp system of the present invention. Lamp system 250 comprises a carrier/charging base generally designated 252 and ten lamp modules generally designated 254. A cover 256, preferably translucent, is removably mounted by any suitable means to the carrier/charging base 252 and a handle member 258, preferably of aluminum but which could be of other metal or material, is attached by any suitable means to be carrier/charging base 252. The cover member 256 protects the lamp modules during charging, storage and transit, and the handle member 258 provides for ease of transport. The number of lamp modules shown in the preferred embodiment is intended to be merely exemplary. It should be understood that the lamp system 250 of the present invention may be constructed with any number of modules.

Figure 20:
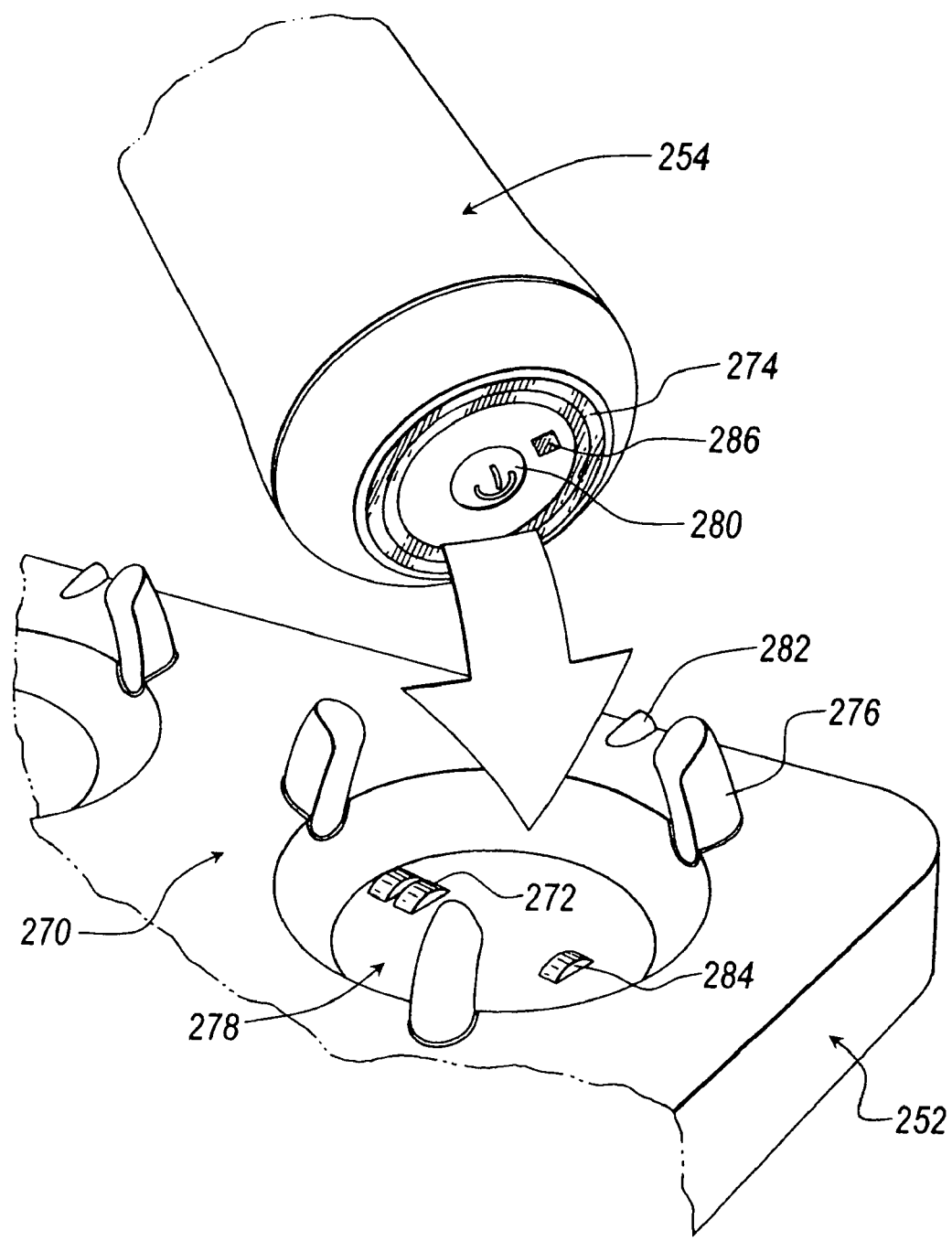
FIG. 20 is a pictorial view showing one module-to-carrier/charging base interface.

Referring now to FIG. 20, reference numeral 270 generally shows a pictorial view of one module-to-carrier/charging base interface. Unlike inductive coupling employed for the hereinabove described embodiments, contacts 272 on carrier/charging base 252 cooperate with contacts 274 to provide the charge signal to each lamp module 254 when supported on the carrier/charging base 252. Spring-loaded arms 276 are provided to hold each lamp module 254 when seated in receptacles generally designated 278 provided therefore on the carrier/charging base 252. And on/off membrane switch 280 (or other suitable means) is provided on each lamp module 254 by which they may be independently turned on/off. A charging status LED 282 for each module is provided on the carrier/charging base 252 that lights when the associated lamp module 254 is fully charged. Seat sensor contacts 284, 286 provides a seat signal used by each lamp module in a manner to be described to inhibit lighting of each lamp module when supported on the carrier/charging base if no AC power is supplied. The seat signal is preferably at ground potential, although any suitable sensor contact or other means providing any signal representative of a lamp module being in supported condition could be employed without departing from the inventive concepts.

Figure 21:
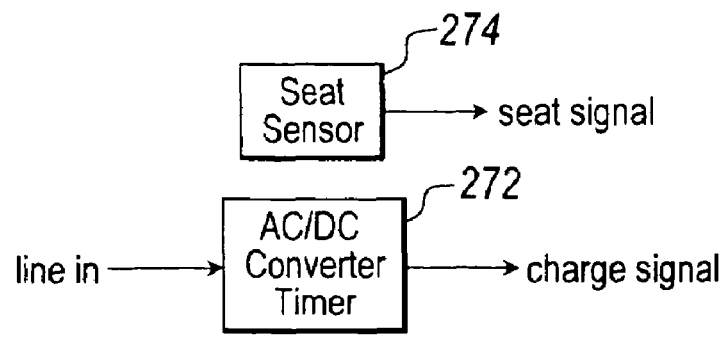
FIGS. 21 and 22 are block diagrams respectively of exemplary carrier/charging base and lamp module circuitry.

Referring now to FIG. 21, reference numeral 270 generally shows a block diagram of the carrier/charging base circuitry. As shown, an AC/DC converter 272 responds to standard AC power to provide a charge signal output signal and the seat sensor 274 provides a seat signal at ground potential. The AC/DC converter 272 preferably includes a timer to turn off the charge signal after a predetermined time determined to provide a full charge for each rechargeable battery pack.

Figure 22:
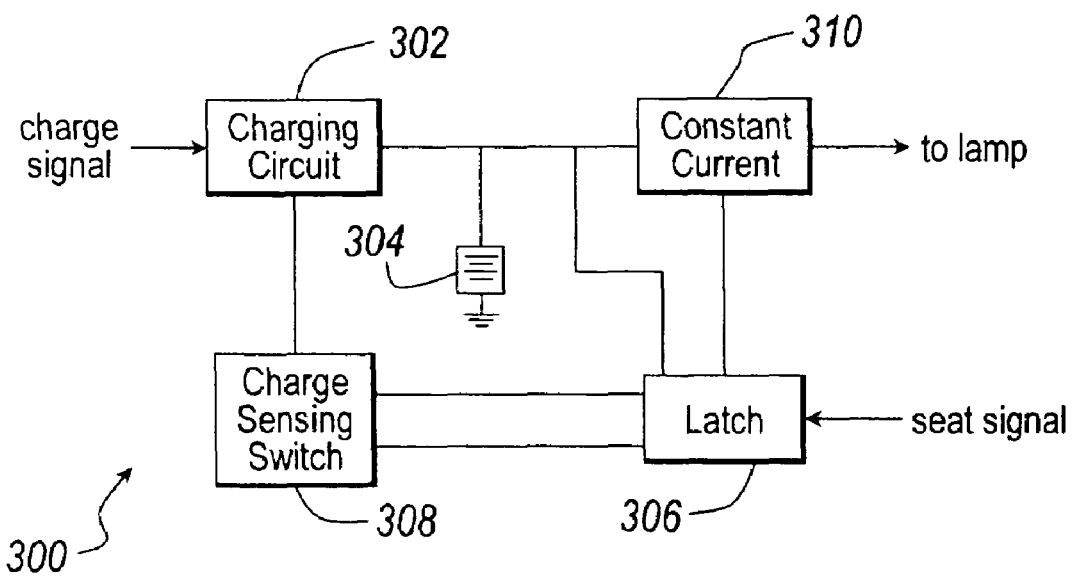

Referring now to FIG. 22, reference numeral 300 generally shows a block diagram of the lamp module circuitry. A charging circuit 302 regulates the voltage and current flowing to battery pack 304 (of each module) to prevent damage to battery pack 304. A latch circuit 306 cuts off current to each lamp when the voltage output of battery pack 304 drops below a predetermined value, thus preventing damage to battery pack 304 which could be caused by fully draining battery pack 304. Latch circuit 306 works in cooperation with a charge-sensing switch 308 to turn off current to each lamp when current is detected in charging circuit 302 or when the seat signal is detected. A constant current source circuit 310 provides a constant flow of current to each lamp. This enables the lamps to shine at a constant brightness despite fluctuations in the output current from battery pack 304. In alternate embodiments, a constant voltage source could be employed.

Figure 23:
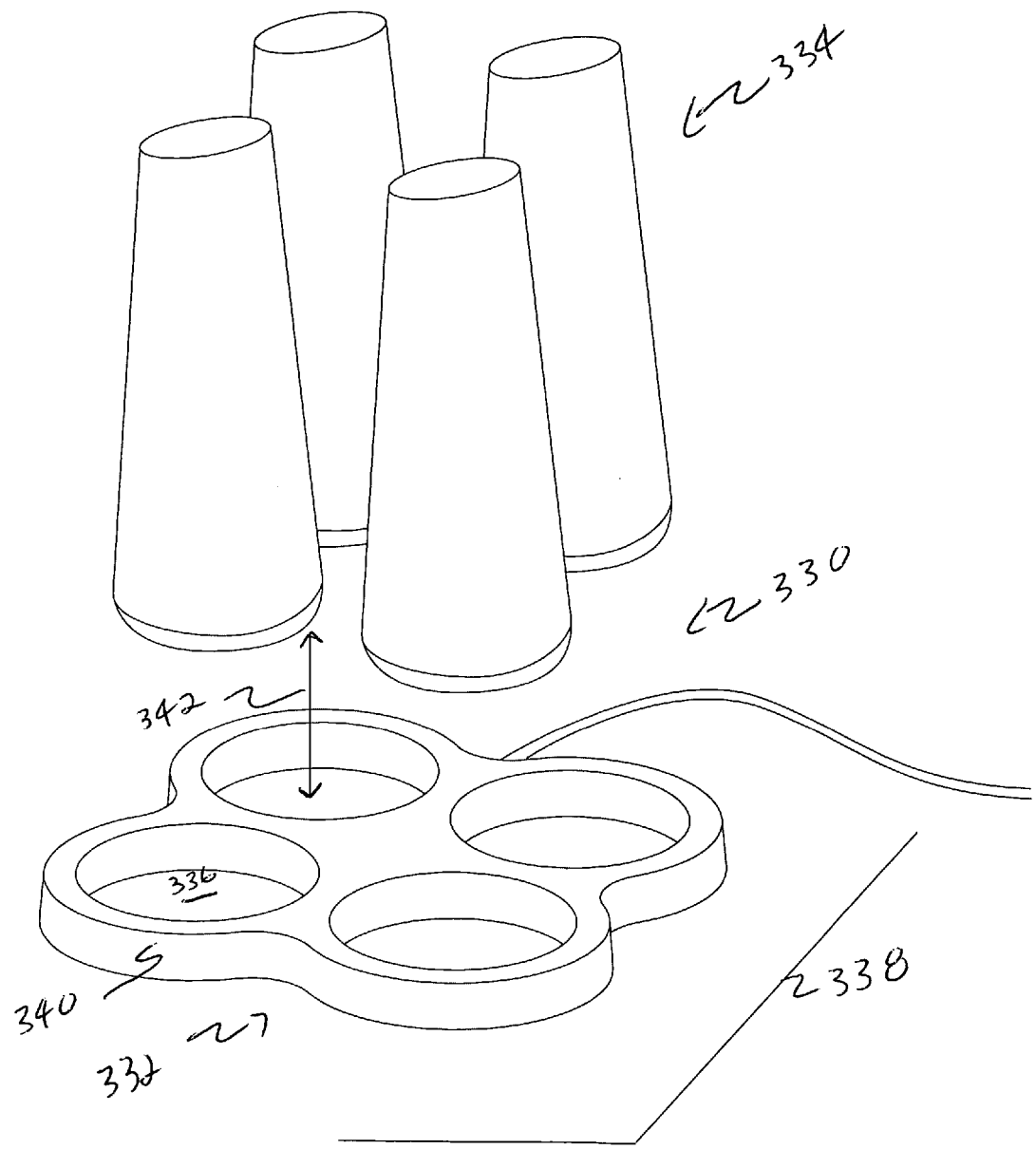
FIG. 23 is a pictorial view of another exemplary embodiment of the present invention, showing mutually movable charger and lamp members.

Referring now to FIG. 23, reference numeral 330 generally refers to another exemplary embodiment of the rechargeable lamp system of the present invention. Lamp system 330 comprises a charger generally designated 332 and four lamp modules generally designated 334. The number of lamp modules shown in the preferred embodiment is intended to be merely exemplary. It should be understood that the lamp system 330 of the present invention may be constructed with any number of modules.

As shown, the charger 332 comprises openings generally designated 336 adapted to receive each lamp module 334 such that each lamp module is supported on surface 338, such as a tabletop, and walls 340 adapted to at least partially surround the base portion of each lamp module 334. The openings 336 and walls 340 are each of generally cylindrical geometry, although another geometry may be employed without departing from the inventive concepts. As illustrated by arrow 342, the charger 332 may be moved upwardly to remove it from the lamp modules 334 while they remain standing on the support 338. An elastomeric material may be provided about the walls 340 and a support tray, not shown, may be employed to carry the charger 332 and/or lamp modules 334.

As in the embodiment described above in connection with the description of the FIGS. 1-16, each lamp module 334 is designed to be charged by magnetic induction; inductive magnetic coupling is provided by primary and secondary coils, not shown, carried within the walls 340 of the charger 332 about the openings 336 of the charger 332 and base portion of the lamp modules 334. Other coupling means such as mating electrical contacts or other means could be employed without departing from the inventive concepts.

As in the embodiment described above in connection with the description of the FIGS. 1-16, modules 334 are each designed to illuminate when not received by charger 332, either when a lamp module is removed from the charger or the charger removed from the lamp modules; or when AC power is cut off to the charger 332. The charger 332 includes a first charge circuit responsive to supplied AC power to provide a charge signal and each lamp module includes a light emitting element connected to a rechargeable battery pack via a second circuit operative in one mode to charge the rechargeable battery pack and de-light the light emitting element in response to the charge signal when each lamp module is received by the charger and operative in another mode to activate the light emitting element in response to the absence of the charge signal, whereby, each lamp module lights if removed from the charger or if the charger is removed from the lamps or if no AC power is supplied to the charger and de-lights when received thereby. The second circuit may advantageously be provided in the charger, in line with the charger, or in a power transformer appropriate for each country, or switching power adapter, or otherwise provided without departing from the inventive concepts.

Figures 24A, 24B, 24C:
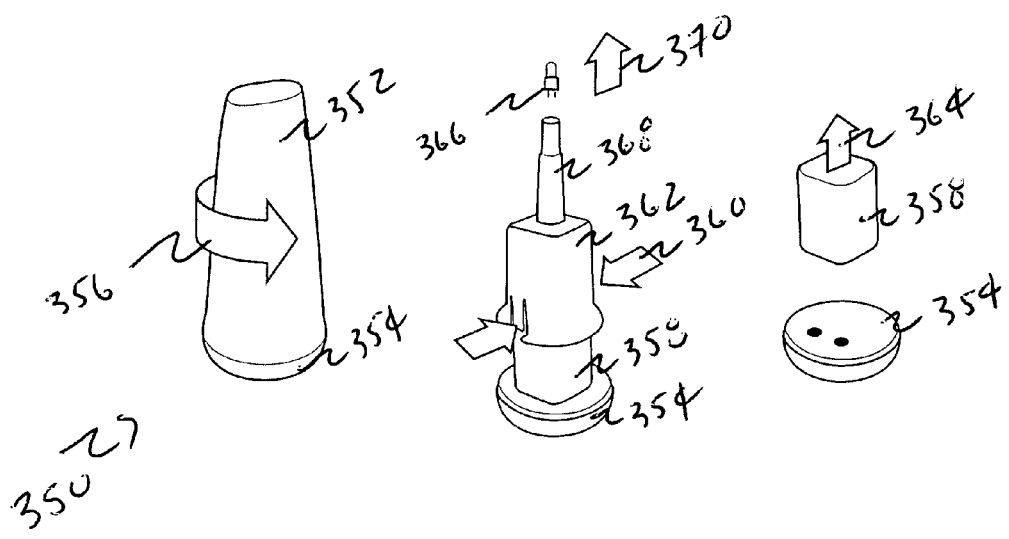
FIG. 24 in the FIGS. 24A-C thereof are pictorial diagrams of one presently preferred lamp module according to the present invention providing ease of lamp and rechargeable battery replacement.

Referring now to FIG. 24, generally designated at 350 (FIG. 24A) is one presently preferred luminary that provides ease of bulb and rechargeable battery replacement. The luminary 350 includes a diffuser 352 manually releasable from base member 354 as by manually rotating the diffuser relative to the base as illustrated by arrow 356. A rechargeable battery 358 (FIG. 24B) is manually releasable from base member 354 by pressing release fingers as illustrated by arrow 360 to detach battery compartment 362 from the base member 354 and removing the rechargeable battery 358 as shown by arrow 364 in FIG. 24C. One or more bulbs 366 are manually releasable from bulb support 368 as illustrated by arrow 370 (FIG. 24B). Light mechanical action may be employed involving a screwdriver or other instrument and/or other bulb and replaceable battery supports and mounts may be employed in alternative embodiments to provide for easy bulb and/or battery replacement without departing from the inventive concepts.

The present invention in its broader aspects is not limited to the described embodiments, and departures may be made therefrom without departing from the principles of the invention and without sacrificing its primary advantages. Obviously, numerous modifications may be made to the present invention. Thus, the invention may be practiced otherwise than as specifically described herein. One feature of one embodiment may be employed in another disclosed embodiment. The power cord may be made removable to base placement without cord limitations. Other modifications will be readily apparent to one of skill in the art without departing from the scope of the present invention.

What is claimed is:

1. An autoilluminating rechargeable lamp system providing soft, candle-like ambient lighting about indoor and outdoor locations, comprising:

a portable charging stand removably supporting a set of luminaries removably supported on the portable charging stand, wherein the portable charging stand and set of luminaries supported on the portable charging stand are freely movable to any indoor and outdoor location, allowing each luminary of the set of luminaries removably supported on the charging stand to be individually removed and placed in the environment of that location;

said portable charging stand removably supporting said set of luminaries including a charge circuit providing a charge signal to each luminary of said set of luminaries supported by said stand;

each said luminary of said set of luminaries providing the illumination and ambience of candles without suffering their undesirable disadvantages of self-consumption, smoke, unintended extinguishment and wax buildup, each said luminary of said set of luminaries including an electric lamp of illumination corresponding to that of a candle, a rechargeable battery pack connected to said lamp and a housing in which the lamp and rechargeable battery pack are mounted, wherein said housing in which the lamp is mounted includes a diffuser having a size and shape resembling a hand holdable candle, and wherein said diffuser having a size and shape resembling a hand holdable candle has a translucence of such transmission and diffusion as to simulate the soft ambience of a glowing candle when the lamp within the housing is lit; and autoilluminating means coupled to each luminary of said set of luminaries and responsive to said charge signal for lighting said lamp of each luminary in response to non-detection of said charge signal, and for de-lighting said lamp of each luminary in response to detection of said charge signal, whereby, each said luminary of said set of luminaries lights if removed from said portable charging stand and de-lights if supported thereby.

2. The autoilluminating rechargeable lamp system of claim 1, wherein said set includes one or more luminaries.

3. The autoilluminating rechargeable lamp system of claim 1, wherein said each luminary includes a lamp receiving member adapated to provide easy replacement of said electric lamp, said lamp receiving member is adapted to allow manual insertion and removal of a replacement lamp without using an instrument.

4. The autoilluminating rechargeable lamp system of claim 1, wherein said each luminary includes a rechargeable battery receiving member adapted to provide easy replacement of said rechargeable battery pack, said rechargeable battery pack receiving member is adapted to allow manual insertion and removal of a replacement rechargeable battery pack without using an instrument.

5. The autoilluminating rechargeable lamp system of claim 1 whereby each said luminary of said set of luminaries supported by said portable charging stand lights in the absence of a charge signal.

6. Autoilluminating rechargeable lamp system providing soft, candle-like ambient lighting about indoor and outdoor locations, comprising:

a portable charging stand removably supporting a set of luminaries removably supported on the portable charging stand, wherein the portable charging stand and set of luminaries supported on the portable charging stand are freely movable to any indoor and outdoor location, allowing each luminary of the set of luminaries removably supported on the charging stand to be individually removed and placed in the environment of that location;

said portable charging stand adapted to removably support said set of luminaries including a first circuit coupled to each luminary of said set of luminaries when supported thereon operative in response to supplied AC power to provide a charge signal to each luminary of said set of luminaries when supported thereon;

each said luminary of said set of luminaries providing the illumination and ambience of candles without suffering their undesirable disadvantages of self-consumption, smoke, unintended extinguishment and wax buildup, each said luminary of said set of luminaries including a light emitting element of illumination corresponding to that of a and a housing in which the light emitting element is mounted, wherein said housing in which the light emitting element is mounted includes a diffuser having a size and shape resembling a hand holdable candle, and wherein said diffuser having a size and shape resembling a hand holdable candle has a translucence of such transmission and diffusion as to simulate the soft ambience of a glowing candle when the light emitting element within the housing is lit;

a sensor to provide a seat signal representative that each luminary of said set of luminaries is supported on said portable charging stand;

wherein each said light emitting element of each luminary of said set of luminaries is connected to a rechargeable battery pack via a second circuit operative in one mode to charge said rechargeable battery pack in response to said charge signal when each luminary of said set of luminaries is supported on said portable charging stand and operative in another mode to activate said light emitting element in response to the absence of said seat signal, whereby, each said luminary lights if removed from said portable charging stand, does not light if no AC power is supplied to said portable charging stand when supported thereon, and does not light if there is no charge signal when supported thereon.

7. The autoilluminating rechargeable lamp system of claim 6, wherein said set includes one or more luminaries.

8. The autoilluminating rechargeable lamp system of claim 6, further including a cover removably mounted to said charging base.

9. The autoilluminating rechargeable lamp system of claim 6, further including a handle mounted to said portable charging stand adapted to allow the stand and luminary set to be hand carried.

10. The autoilluminating rechargeable lamp system of claim 6, further including a switch mounted to at least one said luminary of said set of luminaries to independently turn it on/off.

* * * * *